(12) United States Patent
Yebka et al.

(10) Patent No.: US 11,038,361 B2
(45) Date of Patent: Jun. 15, 2021

(54) BATTERY WITH CATHODE MATERIALS FOR CHARGING AT DIFFERENT RATES

(71) Applicant: Lenovo (Singapore) Pte. Ltd., New Tech Park (SG)

(72) Inventors: Bouziane Yebka, Apex, NC (US); Joseph Anthony Holung, Wake Forest, NC (US); Tin-Lup Wong, Chapel Hill, NC (US); Philip John Jakes, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1294 days.

(21) Appl. No.: 14/658,733

(22) Filed: Mar. 16, 2015

(65) Prior Publication Data

US 2016/0276860 A1 Sep. 22, 2016

(51) Int. Cl.
*H01M 4/36* (2006.01)
*H02J 7/04* (2006.01)
*H01M 10/42* (2006.01)
*H01M 10/44* (2006.01)
*H01M 10/052* (2010.01)
*H02J 7/00* (2006.01)
*H01M 4/505* (2010.01)
(Continued)

(52) U.S. Cl.
CPC ........... *H02J 7/0068* (2013.01); *H01M 4/366* (2013.01); *H01M 4/505* (2013.01); *H01M 4/525* (2013.01); *H01M 4/5825* (2013.01); *H01M 10/052* (2013.01); *H01M 10/425* (2013.01); *H01M 10/44* (2013.01); *H02J 7/007* (2013.01); *H02J 7/04* (2013.01); *H01M 4/364* (2013.01); *H01M 2010/4271* (2013.01)

(58) Field of Classification Search
CPC ............ H02J 7/0068; H02J 7/00; H01M 4/58; H01M 4/36; H01M 4/366; H01M 4/505; H01M 4/525; H01M 4/131; H01M 4/136; H01M 4/5825; H01M 10/42; H01M 10/4257; G06F 1/26
USPC ........................................ 429/188; 320/160
See application file for complete search history.

(56) References Cited

U.S. PATENT DOCUMENTS 5,898,290 A 4/1999 Beard et al.
6,160,490 A 12/2000 Pace et al.
(Continued)

FOREIGN PATENT DOCUMENTS

KR 20150019295 2/2015

OTHER PUBLICATIONS

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Non-Final Office Action dated Jan. 14, 2016.

(Continued)

*Primary Examiner* — Richard Isla
*Assistant Examiner* — Dung V Bui
(74) *Attorney, Agent, or Firm* — John M. Rogitz; John L. Rogitz

(57) ABSTRACT

In one aspect, a battery includes at least one anode, at least one cathode, and electrolyte between the at least one anode and at least one cathode. The at least one cathode comprises at least a first charging material and at least a second charging material different from the first material.

28 Claims, 8 Drawing Sheets

(51) Int. Cl.
    *H01M 4/525* (2010.01)
    *H01M 4/136* (2010.01)
    *H01M 4/58* (2010.01)
    *H01M 4/131* (2010.01)
    *G06F 1/26* (2006.01)

(56) References Cited

U.S. PATENT DOCUMENTS

| | | |
|---|---|---|
| 7,191,077 B2 | 3/2007 | Mese et al. |
| 8,125,186 B2 | 2/2012 | Carkner |
| 8,380,999 B1 | 2/2013 | Robison et al. |
| 8,729,862 B2 | 5/2014 | Yebka et al. |
| 9,685,810 B1* | 6/2017 | Bhardwaj ............... B60L 58/13 |
| 2001/0035732 A1 | 11/2001 | Sakakibara |
| 2004/0076882 A1* | 4/2004 | Hosoya ................. H01M 4/525 429/223 |
| 2004/0130295 A1 | 7/2004 | Kim |
| 2004/0199297 A1 | 10/2004 | Schaper et al. |
| 2004/0222768 A1 | 11/2004 | Moore et al. |
| 2004/0225333 A1 | 11/2004 | Greatbatch et al. |
| 2007/0057228 A1* | 3/2007 | Huang .................... H01M 4/13 252/182.1 |
| 2007/0188134 A1 | 8/2007 | Hussain et al. |
| 2008/0131777 A1* | 6/2008 | Hatta ...................... C01B 25/45 429/219 |
| 2008/0138709 A1* | 6/2008 | Hatta .................. H01M 4/5825 429/221 |
| 2009/0024863 A1 | 1/2009 | Karstens |
| 2009/0085528 A1 | 4/2009 | Yamada |
| 2009/0273318 A1 | 11/2009 | Rondoni et al. |
| 2010/0060232 A1 | 3/2010 | Boyles et al. |
| 2010/0085017 A1 | 4/2010 | Heeringa et al. |
| 2010/0123436 A1 | 5/2010 | Herrod et al. |
| 2010/0217466 A1 | 8/2010 | Ichikawa |
| 2010/0289457 A1* | 11/2010 | Onnerud ............. H02J 7/00711 320/162 |
| 2010/0301810 A1* | 12/2010 | Biondo .................... H04Q 9/00 320/155 |
| 2011/0018679 A1 | 1/2011 | Davis et al. |
| 2011/0057603 A1 | 3/2011 | Marty et al. |
| 2011/0133699 A1* | 6/2011 | Howard ................ H01M 4/131 320/137 |
| 2011/0143777 A1* | 6/2011 | Kim ........................ G01S 19/34 455/456.3 |
| 2011/0195303 A1* | 8/2011 | Chang .................. H01M 4/505 429/188 |
| 2011/0313613 A1 | 12/2011 | Kawahara et al. |
| 2012/0098488 A1 | 4/2012 | Ichikawa |
| 2012/0273716 A1* | 11/2012 | Li ......................... H01M 4/366 252/182.1 |
| 2012/0299554 A1 | 11/2012 | Kruglick |
| 2013/0006677 A1* | 1/2013 | Anglin ................... G05B 15/02 705/5 |
| 2013/0335030 A1* | 12/2013 | Joe ........................ H02J 7/0063 320/134 |
| 2013/0335031 A1* | 12/2013 | Joe ........................ G01R 31/3648 320/134 |
| 2014/0002025 A1 | 1/2014 | Yamamoto et al. |
| 2014/0025322 A1* | 1/2014 | Yang ................. H04W 52/0258 702/63 |
| 2014/0028264 A1* | 1/2014 | Taniyama ............. H01M 4/364 320/134 |
| 2014/0111143 A1* | 4/2014 | Sells ...................... H02J 7/0047 320/107 |
| 2014/0132222 A1* | 5/2014 | Joe ........................ G01R 31/367 320/134 |
| 2014/0195826 A1 | 7/2014 | Wojcik et al. |
| 2014/0295261 A1* | 10/2014 | Miyake ................ H01M 4/5825 429/199 |
| 2015/0008879 A1* | 1/2015 | Schneider ............. H02J 7/0045 320/110 |
| 2015/0046110 A1* | 2/2015 | Joe ........................ H01M 4/364 702/63 |
| 2015/0048803 A1 | 2/2015 | Noh et al. |
| 2015/0066407 A1* | 3/2015 | Joe ..................... G01R 31/3606 702/63 |
| 2015/0084778 A1 | 3/2015 | Mittal et al. |
| 2015/0145480 A1* | 5/2015 | Yebka .................... H02J 7/0047 320/112 |

OTHER PUBLICATIONS

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Non-Final Office Action filed Apr. 6, 2016.

John Weldon Nicholson, Axel Ramirez Flores, Howard Jeffrey Locker, Scott Edwards Elso, John Miles Hunt, Kenneth Scott Seethaler, Larry Glenn Estes, Jeremy Robert Carlson, "Systems and Methods to Increase and Decrease Charging Currents to Battery", related pending U.S. Appl. No. 14/143,429, Applicant's response to final office action filed Oct. 20, 2016.

John Weldon Nicholson, Axel Ramirez Flores, Howard Jeffrey Locker, Scott Edwards Elso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Final Office Action dated May 18, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Non-Final Office Action filed Mar. 10, 2017.

John Weldon Nicholson, Axel Ramirez Flores, Howard Jeffrey Locker, Scott Edwards Kelso, John Miles Hunt, Kenneth Scott Seethaler, Larry Glenn Estes, "Systems and Methods to Increase and Decrease Charging Current to Battery" file history of related U.S. Appl. No. 14/143,429.

Nathan J. Peterson, Amy Leigh Rose, Jennifer Lee-Baron, John Scott Crowe, "Adjusting Light Emitted by a Device Based on Charge or Discharge Rate of a Battery Associated with the Device" file history of related U.S. Appl. No. 14/270,771 filed May 6, 2014.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Non-Final Office Action dated Dec. 12, 2016.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Non-Final Office Action filed Dec. 15, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Non-Final Office Action dated Sep. 29, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and ecrease Charging Current to Battery", related U.S. Appl. No. 14/143,429, Applicant's response to Final Office Action filed Aug. 10, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and

(56) References Cited

OTHER PUBLICATIONS

Methods to Increase and Decrease Charging Current to Battery", related U.S. Appl. No. 14/143,429, Final Office Action dated Feb. 1, 2018.

* cited by examiner

BATTERY WITH CATHODE MATERIALS FOR CHARGING AT DIFFERENT RATES

FIELD

The present application relates generally to batteries having cathode materials for charging the batteries at different rates.

BACKGROUND

As recognized herein, there has arisen a need to charge a battery at a relatively fast rate in situations where, e.g., a power source for charging the battery will be available for only a relatively short amount of time. However, as also recognized herein, there are currently no adequate solutions for doing so without also reducing battery life span to an undesirable level.

SUMMARY

Accordingly, in one aspect art electrode comprises a first constituent made of a layered salt and a second constituent intermixed with the first constituent and selected from at least one of a spinel and an olivine.

In another aspect, a device includes a processor, at least one system component accessible to the processor, and a battery which powers the processor and the at least one system component. The battery includes at least one anode, at least one cathode, and electrolyte between the at least one anode and at least one cathode. The at least one cathode includes at least a first charging material and at least a second charging material different from the first material.

In still another aspect, a method includes providing a negative electrode in battery easing for a battery, providing a positive electrode in the battery casing, and providing electrolyte between the negative electrode and the positive electrode. The positive electrode includes at least two different compounds which are useable to charge the battery at different rates of charge.

In yet another aspect, a battery pack includes a processor and a battery which powers the processor. The battery includes at least one anode, at least one cathode, and electrolyte between the at least one anode and at least one cathode. The at least one cathode includes at least a first charging material and at least a second charging material different for the first material.

The details of present principles, both as to their structure and operation, can best be understood in reference to the accompanying drawings, in which like reference numerals refer to like parts, and in which:

DETAILED DESCRIPTION

Figure 1:
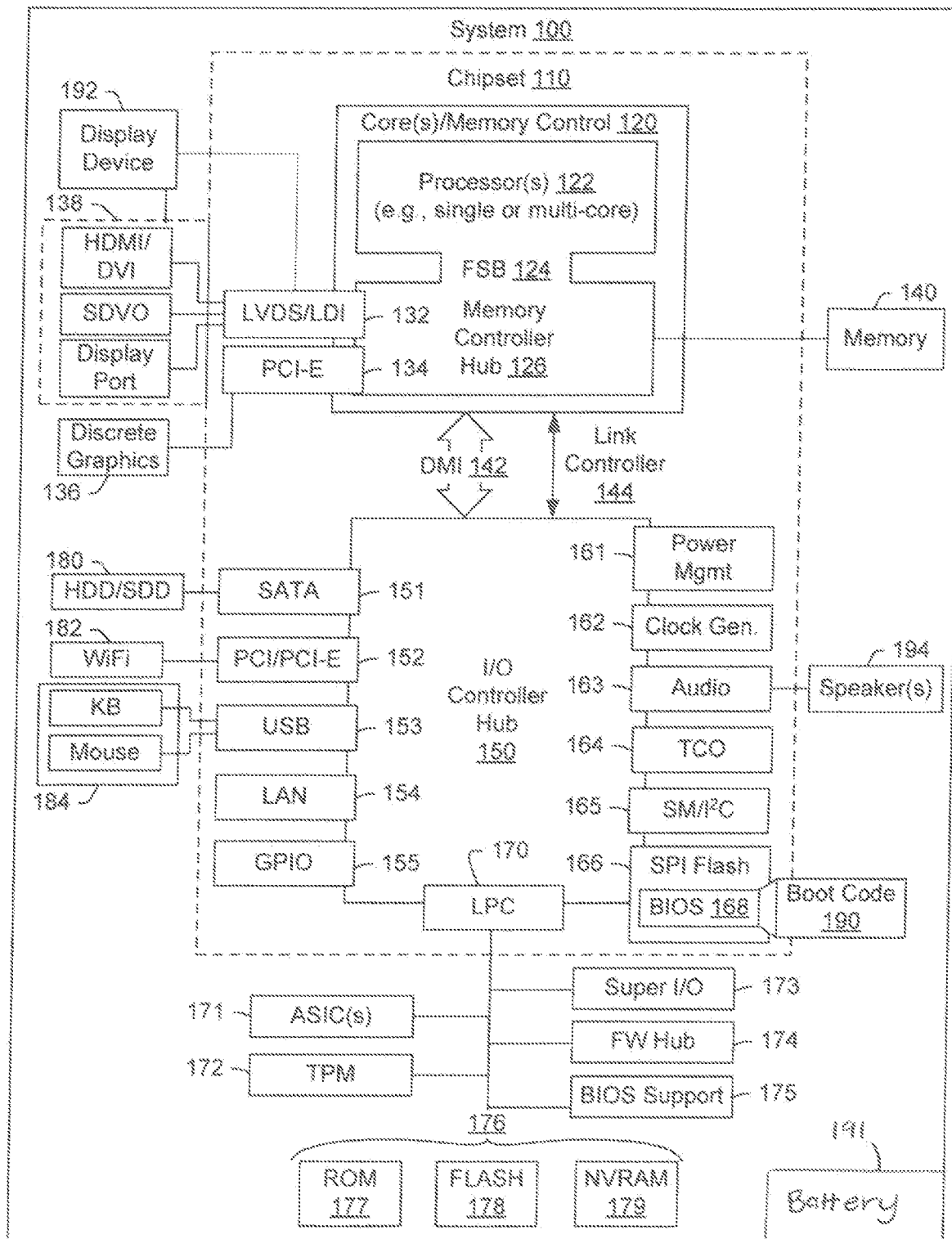
FIG. 1 is a block diagram of an example system in accordance with present principles.

This disclosure relates in some ways to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to component-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose process in or by a digital signal processor (DST), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. it is to be understood that logic divulged as, being executed by, e.g., a module can be redistributed to other software modules and/or combined together in a single module and/or made available in a shareable library.

Logic when implemented in software, can be written in an appropriate language such as but not limited to C# or C++, can be stored on or transmitted through a computer-readable storage medium (e.g., that may no be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being receive and from digital to analog when being transmitted. The processor then processes the data through its shin registers to output calculated data on output lines, for presentation of the calculated data on the device.

Components included in one embodiment can be used in other embodiments in arty appropriate combination. For example, any of the various components described herein and/or depicted in the Figures may be combined, interchanged or excluded from other embodiments.

"A system having at least one of A, B, and C" (likewise "system having at least one of A, B, C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A atone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it sows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192. (e.g., a CRT, a flat panel, a projector, a touch-enabled display, etc.). A block 138 includes some examples of technologies that may be supported via the LVDS interface 132 (e.g., serial digital video HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, one of more GPUs). An example system may include AGP or PCI-E for support of graphics.

The I/O hub controller 150 includes a variety of interfaces. The example of FIG. 1 includes a SATA interface 151 one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), as total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and hoot code 190. With respect to network connections, the I/O hub controller 150 may include integrated gigabit Ethernet controller lines multiplexed with a PCI-F interface port. Other network features may operate independent of a PCI-E interface.

The interfaces of the I/O hub controller 150 provide for communication with various devices, networks, etc. For example, the BATA interface 151 provides for reading, writing or reading and writing information on one or more drives 180 such as HDDs, SDDs or a combination thereof, but in any ease the drives 180 are understood to be e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1 the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute hoot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As may also be appreciated from FIG. 1, the system 100 includes at least one battery 191 which comprises one or more battery cells and powers the system 100. The battery 191 may receive power from a power source (e.g., a power supply unit) which receives power from e.g. a wall outlet and provides it to the battery 191 (e.g. via a power source and/or charger interface) to charge the battery 191. In any case, the battery 191 is understood to comprise at least one anode and/or negative electrode, at least one cathode and/or positive electrode, and electrolyte therebetween.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, a three-dimensional (3D) camera, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
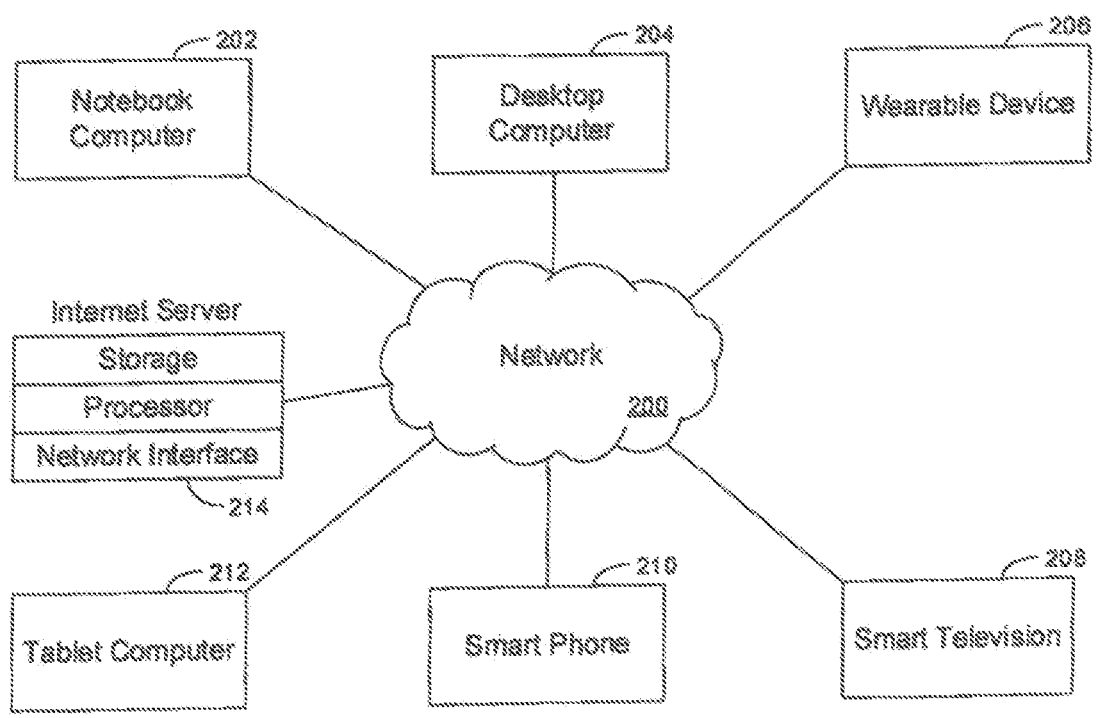
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles, where any of the devices shown may be powered by a battery with at least one cathode comprised of different materials in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart plume 210, a tablet computer and a server 214 such as e.g. an Internet server that may e.g. provide cloud storage accessible to the devices 202-212. It is to be understood that the devices 202-214 are configured to communicate with each other over the network 200 to undertake present principles.

Figure 3:
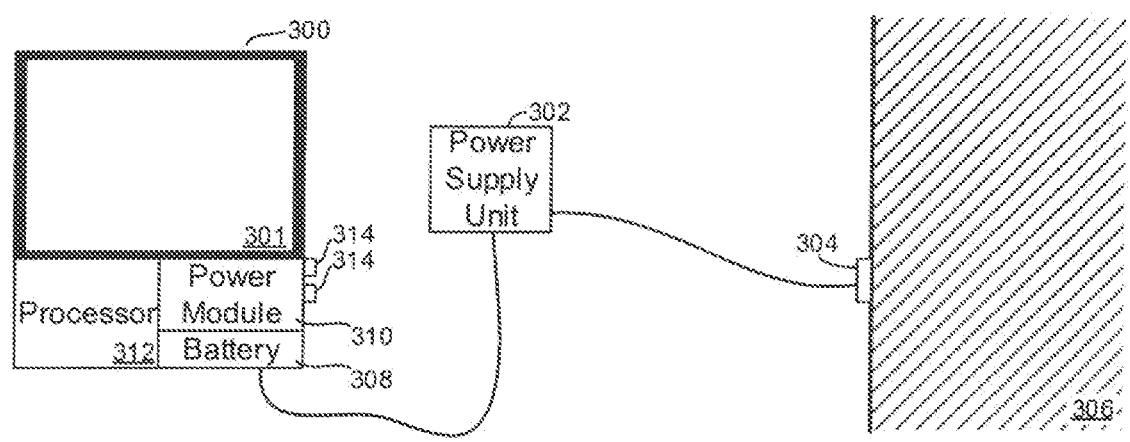
FIG. 3 is a block diagram of an example system connected to a wall outlet accordance with present principles.

Now in reference to FIG. 3, it shows an example device 300 (e.g. having a touch-enabled display 301) connected via a power supply unit (PSU) 302 to a wall outlet 304 in a wall 306 for charging a battery 308 on the device 300. Power coming from the outlet 304 through the PSU 302 and to the device 300 may be received at e.g. a power module (PM) 310 on the device 300 that is connected to the PSU 302. The PM 310 is understood to be controlled by a processor 312 to control, modify, and/or limit at the PM 310 current from the PSU 302 which is passed to the battery 308 to charge it in accordance with present principles.

Still in reference to FIG. 3, note that at least a portion of the housing for the device 300 (e.g. a portion housing the PM) has protruding therefrom plural elements 314 (e.g. physical, depressable buttons and/or touch-activated buttons) which are respectively selectable to provide user input indicating which of different charge rates and/or charge levels to use to charge the battery 308, where the different charge rates are respectively associated with different ones of the elements 314. Though not shown from the block diagram of FIG. 3, it is to be understood that the elements 314 may be labeled in accordance with their associated charge rates and/or levels to indicate to the user which respective element 314 is associated with which charge rate and/or level. These labels may indicate e.g. specific numbers associated with the charge rates. E.g., a charge rate of 1.5 C may be indicated. In addition to or in lieu of the foregoing, the labels may indicate in lay person terms that one element 314 is for e.g. "normal charge" while, another element 314 is for "fast charge".

Figure 4:
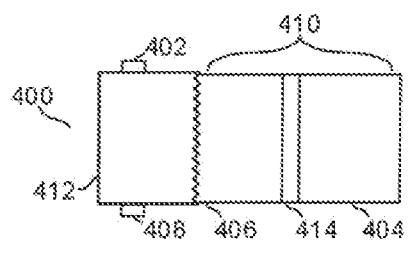
FIG. 4 is a block diagram of an example battery in accordance with present principles.

Moving on, reference it made to FIG. 4, which shows an example cylindrical battery 400 in accordance with present principles. The battery 400 has a positive terminal 402 connected to at least one cathode 404, and a negative terminal 406 connected to at least one anode 408. Note that FIG. 4 has a portion of the battery 400 cut away for clarity, with the anode/cathode assembly 410 being "roiled out" of the battery 400 for illustration. Regardless, the assembly 410 is understood to be disposable within the casing 412 of the battery 400 at manufacture. The assembly 410 includes the at least one cathode 404, the at least one anode 408, and electrolyte 414 between and separating the cathode(s) 404 from the anode(s) 408.

Figure 5:
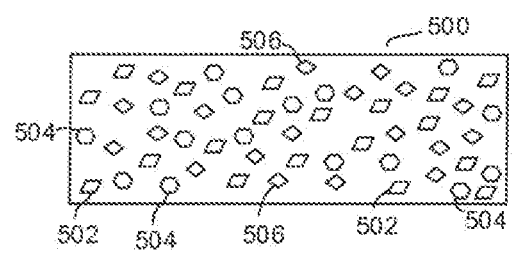
FIG. 5 is a block diagram of an example cathode in accordance with present principles.

FIG. 5 is a block diagram of an example cathode 500 that may be included in a battery in accordance with present principles. The cathode 500 comprises at least a first constituent and/or material 502, second constituent and/or material 504 different than the first constituent and/or material 502, and a third constituent acid or material 506 different than the first constituent and or material 502 and different than the second 1 constituent and/or material 504. The constituents 502-506 may be e.g. mixed from powdered form during the "raw materials" processing and/or during slurry mixing, and then applied to a cathode base (e.g. coated and/or painted thereon) to thus establish a cathode in accordance with present principles.

Still in reference to FIG. 5, it is to be understood that the constituents 502-506 respectively have different chemical compositions, and that these different constituents are therefore able to help charge the battery at different maximum current rates based on their respective characteristics. Thus, e.g. the first constituent 502 may be incorporated to charge the battery at a faster rate than the constituent 504 (e.g. based on the application of current of a certain rate at which the first constituent 502 reacts to charge and at which the constituent 504 does not react to charge the battery), and similarly the third constituent 506 may be incorporated to charge the battery at a slower rate than both the first and second constituents 502 and 504. Furthermore, it is to be understood that each of the constituents 502-506 may be incorporated to charge the battery at e.g. the slower rate fir the third constituent 506. Notwithstanding, it is to be understood that the constituent 504 may have a higher capacity than the constituent 501 and that the constituent 506 may have a higher capacity than both of the constituents 502 and 504 owing to its chemical properties (it being recognized herein that for some materials, a trade off exists that relatively faster charging materials may not have as much capacity as relatively slower charging materials, and hence the higher capacity materials be used to "top off" or otherwise charge the battery to fully charged such as once an initial charge up to a threshold amount (e.g., twenty percent of battery capacity) has been achieved using a lower capacity but faster charge rate material).

In any case, it is to be understood that in at least some embodiments, a cathode in accordance with present principles may include a first constituent made of a layered salt and a second constituent intermixed with the first constituent. In some embodiments both a spinel and an olivine may be mixed with the layered salt. Accordingly, in some embodiments the second constituent may comprise a spinel, and the cathode may also comprise a third constituent intermixed with the first and second constituents, were the third constituent comprises an olivine.

By spinel it is meant oxides of Aluminum, Magnesium, Chromium, Iron, Zinc, or Manganese and occurring in the form of octahedral crystals. In one embodiment, spinels may include Manganese. In a particular embodiment, the spinel may include Manganese and Lithium and more particularly may be $LiMn_2O_4$ or $LiMn_{3/2}Ni_{1/2}O_4$. The table below sets forth example layered slats, spinels, and olivines.

TABLE 1

Electrochemical characteristics of main three classes of insertion cathode compounds

| Structure | Compound | Partial specific capacity (mAh/g) | Average potential (V vs. $Li^0/Li^+$) |
|---|---|---|---|
| Layered | $LiCoO_2$ | 140 | 4.2 |
|  | $LiNi_{1/3}Mn_{1/3}Co_{1/3}O_2$ | 200 | 4.0 |
| Spinel | $LiMn_2O_4$ | 120 | 4.1 |
|  | $LiMn_{3/2}Ni_{1/2}O_4$ | 120 | 4.7 |
| Olivine | $LiFePO_4$ | 160 | 3.45 |
|  | $LiFe_{1/2}Mn_{1/2}PO_4$ | 160 | 3.4/4.1 |

In some embodiments, the layered salt may comprise Lithium. Also in some embodiments, the layered salt may comprise $LiMO_2$, where M is Cobalt (Co), Nickel (Ni), and/or Manganese (Mn). Accordingly, in a particular embodiment, the layered salt may be $LiCoO_2$ and/or $LiNi_{1/3}Mn_{1/3}Co_{1/3}O_2$.

The olivine may comprise Lithium. Also in some embodiments, the olivine may comprise $LiMPO_4$, wherein M comprises Iron (Fe) and/or Manganese (Mn). Accordingly, in a particular embodiment, the olivine may be $LiFePO_4$ and/or $LiFe_{1/2}PO_4$.

Figure 6:
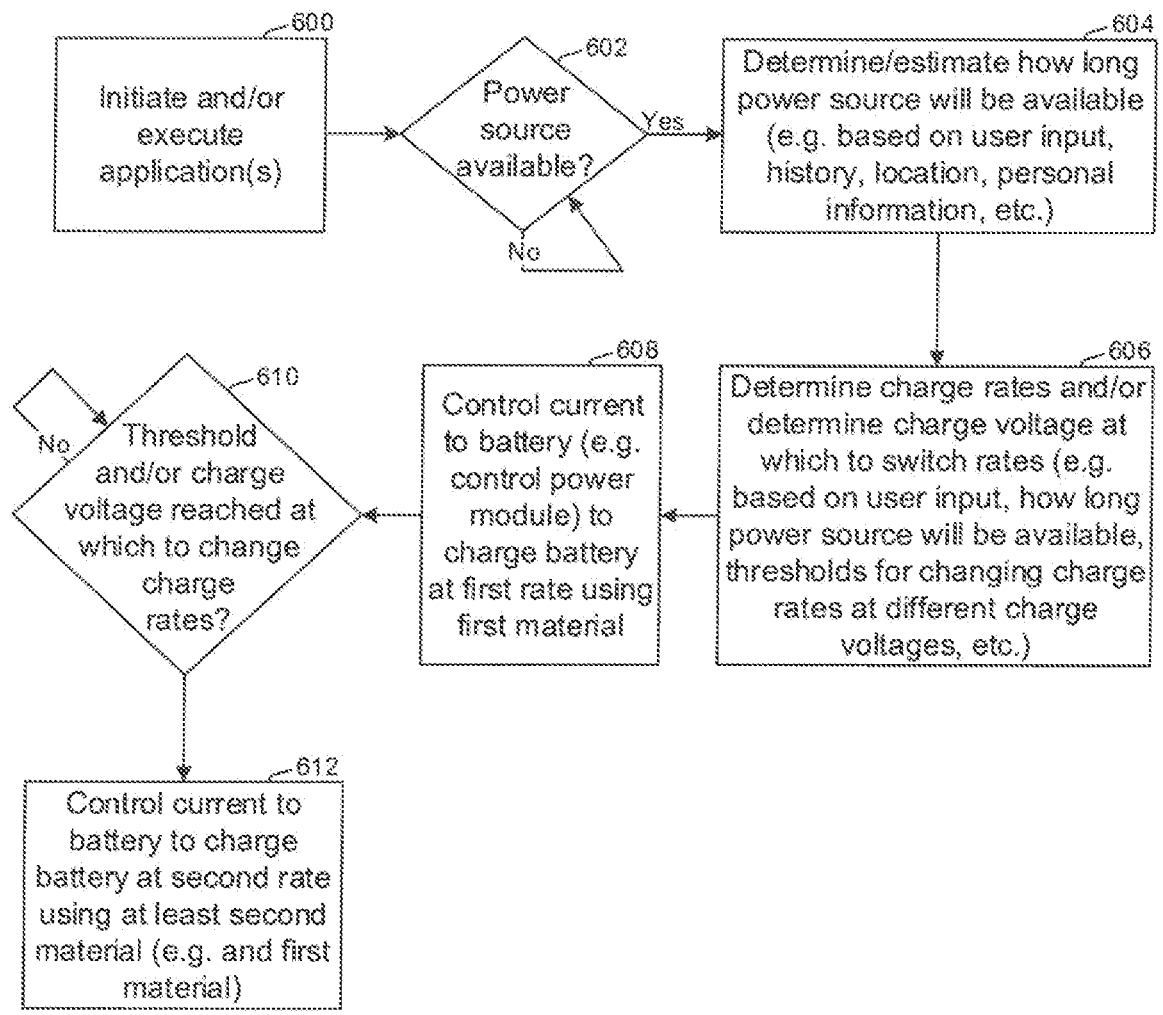
FIG. 6 is a flow chart showing an example algorithm in accordance with present principles.

Referring now to FIG. 6, it shows example logic that may be undertaken by a device such as the system 100 in accordance with present principles (referred to below as the "present device"). Beginning at block 600, the logic initiates and/or executes one or more applications for undertaking present principles, such as e.g. a power management application, a battery charging application, etc. From block 600 the logic proceeds to decision diamond 602, where the logic determines whether a power source is available for charging a battery on the present device. This determination may be made e.g. responsive to a signal from a power module on the present device that it has been electrically engaged with a power supply unit and/or a source of power (e.g. a wall outlet).

A negative determination at diamond 602 causes the logic to continue making the determination thereat until an affirmative one is made. Then, responsive to an affirmative determination at diamond 602, the logic moves to block 604. At block 604 the logic determines and/or estimates bow long the power source will be available. The determination at block 604 may be based on e.g. receipt of user input indicating how long the power source will be available, charging history information for past instances of charging the present device (e.g. specifically based on lengths of times of previous charges at the location at which the present device is currently located, and/or based on lengths of times of previous charges at the time of day corresponding to the current time of day (or at least similar time ranges, such as e.g. within a one hour threshold, in the morning, after noon, or at night)).

In any case, from block 604 the logic moves to block 606. At block 606 the logic determines one or more charge rates at which to charge the battery, and/or determines charge voltages and/or charge levels for the battery at which a change in charge rates should occur from one of the determined charge rates to another of the determined charge rates. E.g., at block 606 the logic may determine, based on the estimation at block 604 of how long the power source will be available, that the battery should be charged at 1.5 C until the battery reaches 3.6 volts (V) of charge, and thereafter the battery should be charged at a rate of 1.0 C until it reaches a threshold voltage amount of 3.8V to which the battery is to be charged based on e.g. both of the estimation and user input of how much of a charge the user desires for the battery to be charged while the power source is available. Accordingly, it is to be understood in reference to block 606 that the logic may make the determination(s) thereat based at least in part on User input (e.g. that a relatively faster charge is desired, what minimum percentage of total charge capacity of the battery is desired to be achieved in a particular charging, instance, and/or an indication of how long the present device will be engaged with a power source), the estimation described above in reference to block 604 of how long the power source be available, previously configured and/or user-input thresholds for changes in the charge rates that are to be used at different charge voltages and/or levels, and/or to be used at different locations and/or times of day.

Still in reference to FIG. 6, from block 606 the logic proceeds to block 608. At block 608 the logic controls current to the battery (e.g. by controlling functions at the PM to limit current passed to the battery) to charge the battery at a first rate using a least a first material suitable for charging at the first rate as discussed herein. From block 608 the logic then proceeds to decision diamond 610. At diamond 610 the logic determines whether a threshold and/or charge voltage has been reached at which a change in charge rates is to occur to thereafter charge at a different (e.g. relatively slower) charge rate. A negative determination at diamond 610 causes the logic to continue making the determination thereat, until an affirmative one is made. Then, responsive to an affirmative determination at diamond 610, the logic proceeds to block 612. At block 612 the logic controls current to the battery (e.g. by controlling functions at the PM to change the current passed to the battery) to charge the battery at a second rate different from the first rate using at least a second material different from the first material suitable for charging at the second rate as discussed herein. Furthermore, in some example embodiments, both the first material and the second material may be used to charge the battery as the slower rate owing to the characteristics of the respective materials. E.g., the first material may have a higher maximum rate at which it can charge the battery, but may also be able to charge the battery at the relatively slower rate at which the second material may also be used to charge the battery.

Figure 7:
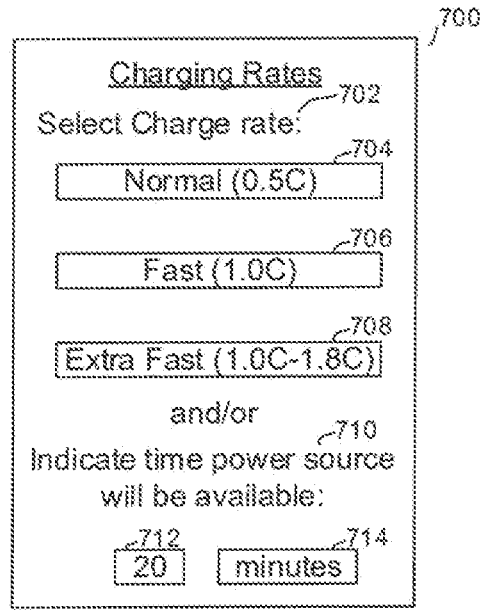
FIGS. 7-9 are example user interfaces (UI) in accordance with present principles.

Continuing the detailed description in reference to FIG. 7, it shows an example user interface (UI) 700 presentable on a display of a device undertaking present principles and/or a display in communication with a device undertaking present principles. The UI 700 is understood to be for a user to select and/or indicate a charge rate at which to charge a battery, and accordingly a first setting 702 pertains to selecting such a charge rate. The first setting 702 has selector elements 704, 706, and 708 associated therewith, where those elements 704-708 are respectively selectable to provide user input to the device of which respective charge rate indicated on each of the elements 704-708 to use. Note that each of the elements 704-708 may contain an indication thereon of one r both of respective actual, numerically-based charge rates that maybe used, and charge rates expressed in more general and/or lay-person terms (e.g. the "normal" rate (e.g. when the battery will be engaged with a power source for an indefinite amount of time and/or more than enough time to charge the battery at a slow rate), a "fast" rate, and an "extra last" rate).

In addition to the foregoing, the UI 700 may also include a second setting 710. The second setting 710 may be configured in addition to or in lieu of configuring the first setting 702 by selecting one of the elements 704-708, but it either case, one or both of the settings 702 and 710 may be used to manage how much current should be provided to the battery for charging for a given time frame. In any case, second setting 710 permits a user to input and/or provide an indication of an expected amount of time a power source Will be available with which the device is or will be engaged (e.g. within a threshold time of configuring the setting 710). Accordingly, a number entry box 712 is shone which is manipulable by a user to enter and/or select a number for the time, and a time increment box 714 is shown which is manipulable by the user to enter and/or select a time increment to be associated with the number entered into box 712. As may be appreciated from example FIG. 7, is user has entered a time of twenty minutes as the time that a power source is expected to be available.

Figure 8:
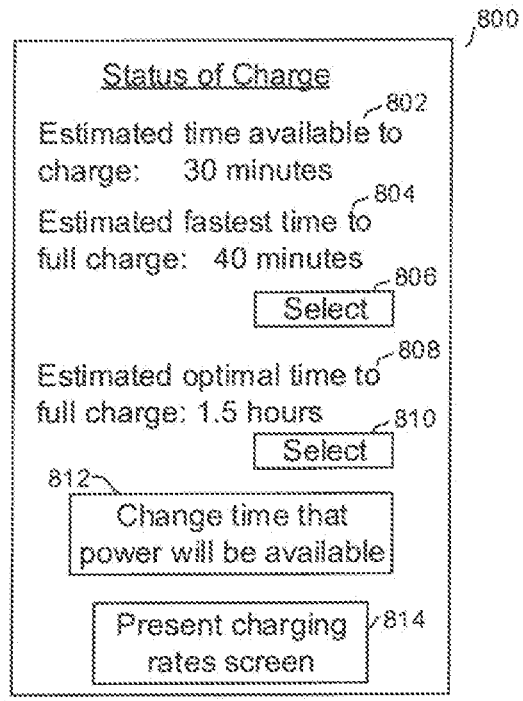

Moving on, reference is now made to FIG. 8. FIG. 8 shows an example UI 800 presentable on a display of a device undertaking present principles and/or a display in communication with a device undertaking present principles. The UI 800 is understood to be for indicating to a user the current status of a battery charge that is occurring and/or indicating how long it will take to charge the battery to a certain (e.g. threshold and/or full) charge level at various charge rates and/or per a charge rate scheme being employed (e.g. combinations of charge rates, and times anther levels at which the charge rate is changed).

Accordingly, a first indication 802 is presented, which indicates that the time the device has estimated to be available for churning, and/or the time indicated by the user that the device will be available for charging, is thirty minutes. A second indication 804 is also presented, which indicates that the fastest charge rate and/or charge rate scheme (e.g., based on the capabilities of the cathode of the battery depending on which materials are included, and how much of those materials are used relative to other charge materials also included on the battery's cathode) will result in the battery being substantially fully charged in forty minutes (e.g. relative to when the UI 800 is presented, e.g. and also with the time that is indicated on the UI 800 changing in real time as actual time passes). Furthermore, note that the indication 804 is accompanied by a "select" selector element 806 which is selectable to provide input to the device to use the fastest charge rate and/or scheme to charge the device's battery.

The UI 800 may also include a third indication 808, which indicates that an optimal charge rate and/or scheme (e.g. for preserving overall battery life through multiple depletions and charges) will result in the battery being at least substantially charged in (e.g. approximately) one and a half hours. Thus, a "select" selector element 810 accompanies the indication 808 and is selectable to provide input to the device to use the "optimal" charge rate and/or scheme to charge the device's battery.

Still in reference to the UI 800 of FIG. 8, it may also include a selector element 812 selectable to change the time that a power source for charging the battery is estimated to be available, and/or to change the time that a power source for charging the battery has been previously input by a user as being available. Thus, in some embodiments, selection of the element 812 may automatically without further user input cause the UI 700 of FIG. 7 to be presented for a user to provide such input using the boxes 712 and 714. In other embodiments, selection of the element 812 may automatically without further user input cause another UI to be presented, and/or overlaid on the UI 800, which has boxes similar function and configuration to the boxes 712 and 714 for providing such input.

Figure 9:
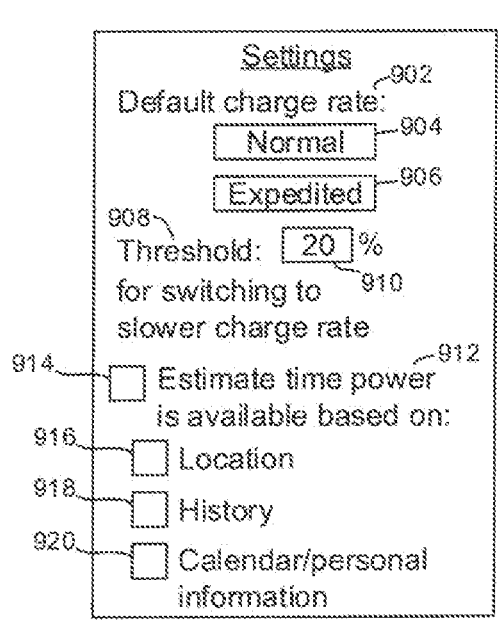

Regardless, before moving on to the description of FIG. 9, it is to be further understood that the UI 800 may also include a selector element 814 selectable to automatically without further user input present the UI 700. Also before moving on to the description of FIG. 9, note that indications such as the ones 804 and 808, and corresponding "select" selector elements such as the elements 806 and 810, may presented on the UI 800 for each of an available set of charge rates and/or schemes for charging a battery e.g. as determined by the device depending on the circumstances, availability of current to charge the battery, capabilities of the battery, etc.

Now in reference to FIG. 9, it shows an example UI 900 presentable on a display of a device undertaking present principles and/or a display in communication with a device undertaking present principles. The UI 900 is understood to be for configuring charge-related settings for a device m accordance with present principles. The UI 900 includes a first setting 902 for a user to select which of two or more charge rates and/or schemes to use as a default rate and/or scheme to charge a battery of the device (e.g. when the device is engaged with a power source and a user subsequently does not indicate a specific rate and/or scheme to use). Thus, a normal selector element 904 is shown which is selectable to establish the default as the "normal" and/or optimal rate and/or scheme (e.g. for preserving overall battery life), and a selector element 906 is also shown which is selectable to establish the default as an expedited rate (e.g. the "fast" or "extra fast" rate disclosed above in reference to FIG. 7).

In addition to the foregoing, the UI 900 also includes a setting 908 for establishing a battery charge level and/or threshold (e.g. threshold voltage) at which charge rates are to be switched during a battery charge from a relatively faster rate to a relatively slower rate. In the example shown, the threshold is establishable as a percentage of a (e.g. at least substantially) complete and/or full charge of the battery, a thus number entry box 910 is presented to which a user may enter a number to establish the threshold percentage. Note that in embodiments where e.g. three or more different charge rates are to be used the UI 900 may present plural boxes similar to the box 910 for progressively switching between the three or more different charge rates from fastest to slowest as the battery approaches fatly charged.

Still in reference to FIG. 9, the UI 900 may also include a setting 919 for configuring the device to estimate time(s) that a source of power for charging is available as disclosed herein. Thus, a check box 914 is presented for enabling the setting 912 (e.g. to enable the device to estimate the time that the power source will be available) Respective check boxes 916, 918 and 920 are also presented for the setting 912, with each one being respectively selectable to configure the device to estimate time that the power source will be available based on different factors, such as e.g. the current location of the device, past charging history for the device and/or battery, and calendar information (e.g. how long a user is expected to be at the current location before they are estimated to need to leave to make another appointment on their calendar based on a location indicated in the calendar for the other appointment) and/or personal user information (e.g. a history of behavior patterns and locations visited at which power sources are available).

Figure 10:
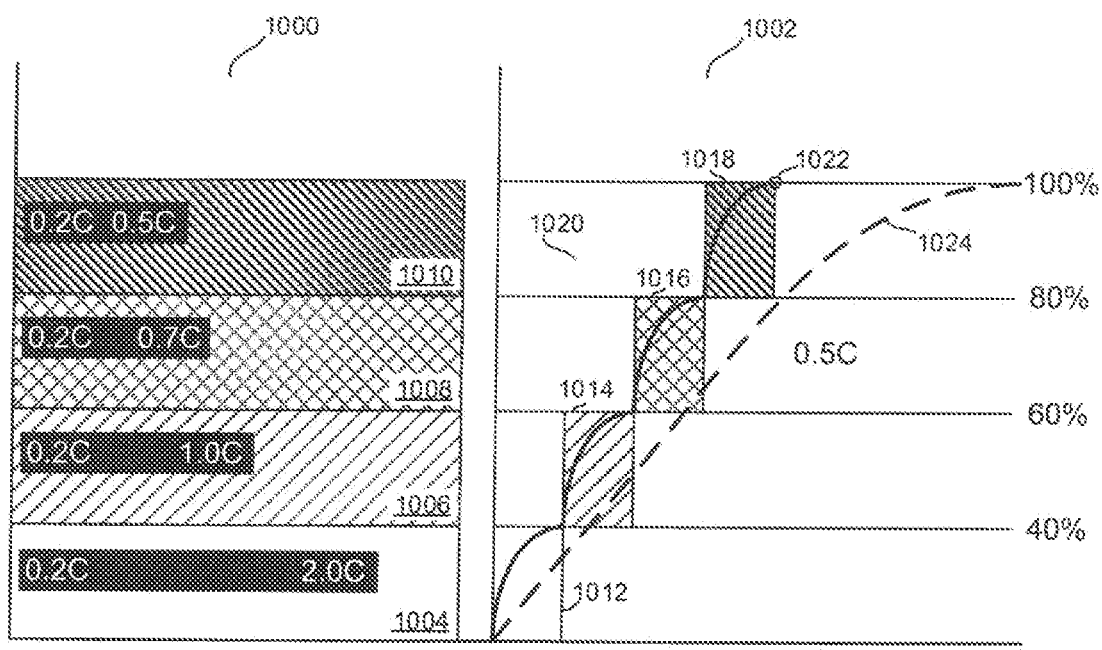
FIGS. 10-15 are example charts illustrating present principles.

Continuing the detailed description in reference to FIG. 10, it shows an example chart 1000 and an example graph 1002 illustrating present principles. Chart 1000 shows that four respective materials 1004, 1006, 1008, and 1010 may be included on a cathode and used to charge a battery in accordance with present principles. As may be appreciated from FIG. 10, chart 1000 demonstrates that for battery charge voltage between 3.0V and 3.4V, a chat e rate anywhere from 0.2 C to 2.0 C may be used at least in part using material 1004. The chart 1000 also indicates that for battery charge voltage between 3.4V and 3.6V, a charge rate from 0.2 C to 1.0 C may be used at least in part using material 1006, that for a battery charge voltage between 3.6V and 3.8V, a charge rate from 0.2 C to 0.7 C maybe used at least in part using material 1008, and that for a battery charge voltage between 3.8V and hall charge at 4.2V, a charge rate from 0.2 C to 0.5 C may be used at least in part using material 1010.

Furthermore, it is to be understood that in example embodiments, the material 1004 may be used to charge the battery in the range of 0.2 C to 2.0 C, the material 1006 may be used to charge the battery in the range of 0.2 C to 1.0 C, the material 1008 may be used to charge the battery in the range of 0.2 C to 0.7 C, and the material 1010 may be used to charge the battery in the range of 0.2 C to 0.5 C. Thus, in some example embodiments, while material 1004 may be used to quickly charge the battery from e.g. zero volts to 3.4 volts at a rate of 1.5 C, materials 1006-1010 do not react to current at that rate and hence will not contribute to the charging of the battery at that rate. However; it is to also be understood that all the materials 1004-1010 may react to a charge rate of 0.3 C and hence all of them may be used to contribute to the charging of the battery when that rate is employed. As but one more example based on the chart 1000, it may be appreciated therefrom that at a charge rate of 0.6 C, the materials 1004-1008 maybe used to charge the battery but that the material 1010 will not respond to current at that rate and hence not contribute to charging the battery at the 0.6 C rate.

Graph 1002 of FIG. 10 also helps illustrate the foregoing, with the Y axis understood to pertain to increasing charge voltage of the battery from bottom to top corresponding to the voltages from bottom to top of the chart 1000. The X axis of the graph 1002 is understood to pertain to the passage of time from left to right as the battery charges. As may be appreciated from the chart 1000, respective, non linear portions 1012, 1014, 1016, and 1018 of a curve 1020 of the graph demonstrate the charging of the example battery over time until the point 1022 of fully charged using the scheme represented by the chart 1000 where charge rates above 0.5 C maybe employed at various stages of the charging. Furthermore, it may be appreciated from the curve 1020 that this scheme using four different charge materials results in the battery being charged in faster time than if had been charged at constant rate of 0.5 C as represented by curve 1024.

Figure 11:
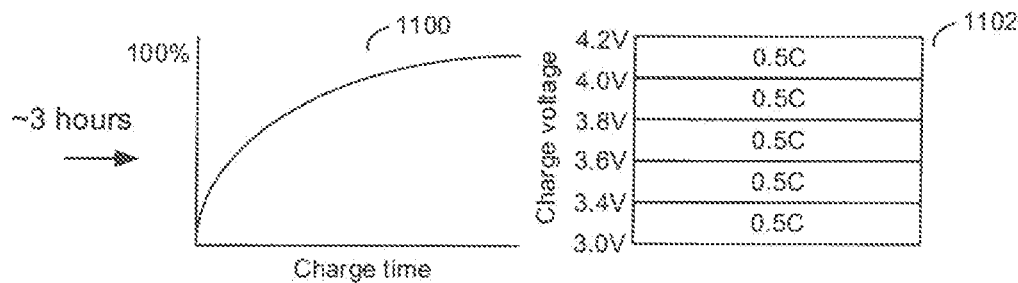

Similar respective charts 1102, 1202, 1302, and 1402, as well as similar respective graphs 1100, 1200, 1300, and 1400, for different charge schemes for a battery are shown in FIGS. 11-14, with each graph 1200, 1300, and 1400 showing a solid, curve for its respective power scheme and perforated curves for the power scheme(s) of the figures of FIGS. 11-14 preceding each respective figure (except in the case of FIG. 11). It is to be understood that different cathode materials fix progressively foster charging the battery at faster charge rates are respectively used in the schemes illustrated in FIGS. 11 to 14. Notwithstanding, it is to also be understood that at, least some of the same cathode materials may be used in the difference schemes of these figures for charging e.g. from 4.0V to 4.2V at a relatively slow charge rate.

Figure 12:
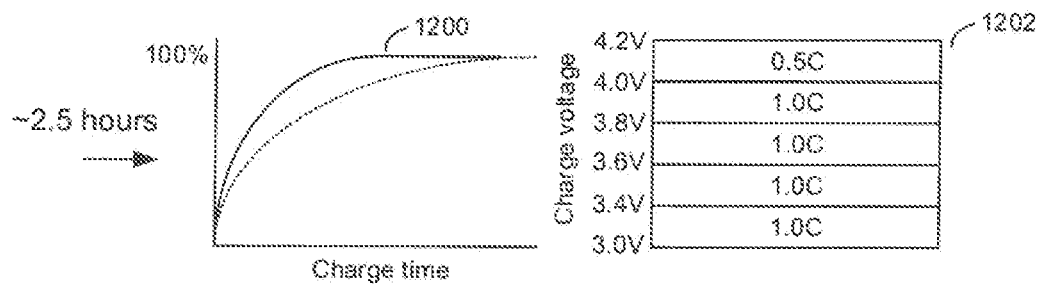
Figure 13:
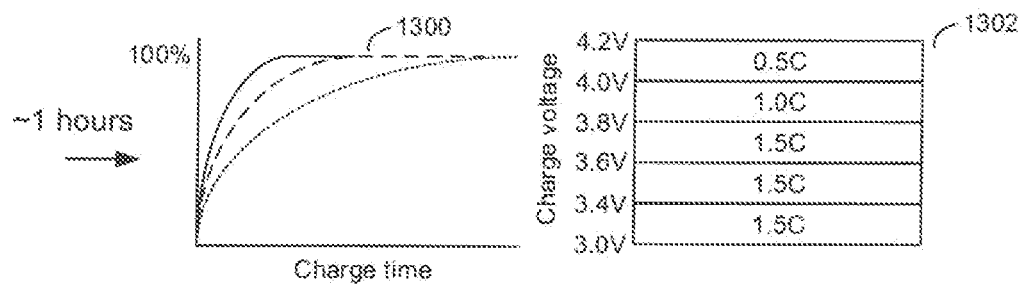
Figure 14:
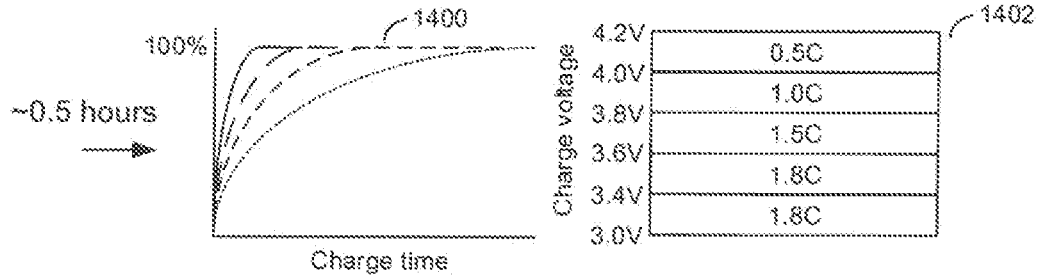

The scheme illustrated by FIG. 11 uses a constant charge rate of 0.5 C, and the scheme illustrated by FIG. 12 uses a charge rate of 1.0 C up to a 4.0V charge and then a rate of 0.5 C to fully charged. In further contrast, the scheme illustrated by FIG. 13 uses a charge rate of 1.5 C up to 3.8V, then a charge rage of 1.0 C up to 4.0V, and then a charge rate of 0.5 C to fully charged. In still thither contrast, the scheme illustrated by FIG. 14 uses a charge rate of 1.8 C up to 3.6V, then 1.5 C up to 3.8V, then 1.0 C up to 4.0V, and last a charge rate of 0.5 C up to fully charged. As may be appreciated from the solid curves respectively shown in these figures, using faster and faster charge rates at the lower charge voltages for the battery results in less time for the battery to reach fully charged.

Figure 15:
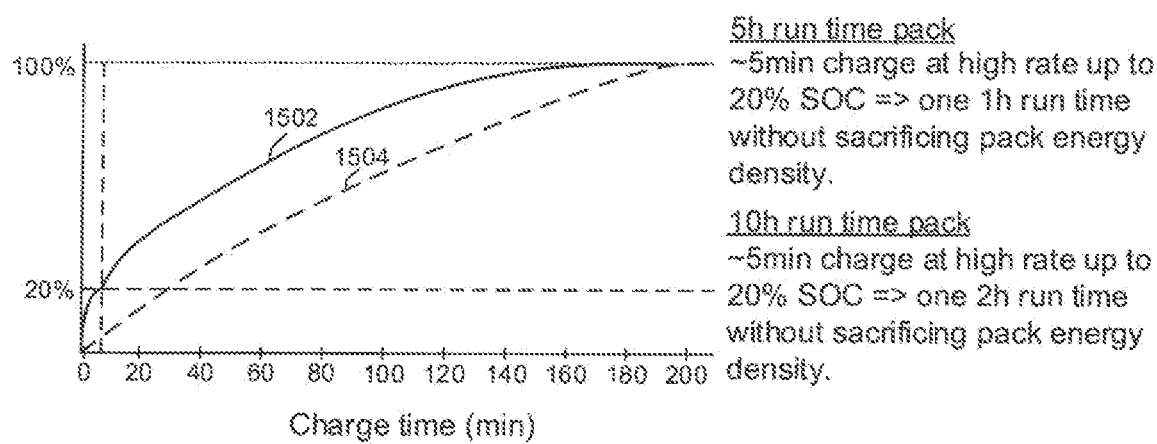

Reference is now made to FIG. 15, which shows an example graph 1500 similar to the ones described above for charging a battery in that the Y axis pertains to charge level (albeit expressed in terms of percentage instead of volts in FIG. 15) while the X axis pertains to charge time in minutes. Solid curve 1502 shows in accordance with present principles that a relatively fast charge may be employed using e.g. a relatively fast charging material (e.g. at least comprising lithium phosphate (e.g. LiFePO$_4$)) up to a threshold of twenty percent of total battery charge, and then a relatively slower charging material (e.g. nickel cobalt manganese) and the fast charging material may be used to charge from twenty percent up to one hundred percent. In contrast, perforated curve 1504 demonstrates that it takes more time to fully charge the battery at the constant charge rate shown.

Thus, assume the battery to which the FIG. 15 pertains has a five hour run time from fully charged for powering a computer until the battery runs out of power. Charging the battery relatively fast up to the twenty percent threshold provides one hour of run time (e.g. without significantly sacrificing battery energy density where e.g. the faster charging material comprises ten percent of all charge material on the cathode) for when a person may only have a limited time to charge the battery at least some so that the user may continue using the computer even after the short amount of time.

As another example, assume the battery to which the FIG. 15 pertains has a ten hour run time from fully charged for powering a computer until the battery runs out of power. Charging the battery relatively fast up to the twenty percent threshold provides two hours of run time (e.g. without significantly sacrificing battery energy density where e.g. the faster charging material, comprises ten percent of all charge material on the cathode) for when the person only has the limited time to charge the battery.

Without reference to any particular figure, it is to be understood that. Lithium phosphate (e.g. $Li_2FePOF$, $LiFePO_4$, etc.) may be used in accordance with present principles since e.g. it maintains much of its structure at different phases, charge levels, and/or depletion of lithium. Furthermore, it is to be understood that an example composition of cathode materials in accordance with present principles may be e.g. ten percent lithium phosphate (e.g. plus or minus five percent) and ninety percent lithium cobalt (e.g. plus or minus five percent).

Also without reference to any particular figure, it is to be understood that at least substantially fully charged may mean as fully charged as possible to achieve. Furthermore it is to also be understood that in at least some embodiments, in addition to or in lieu of a processor on a device such as the system 100 regulating current to a battery in accordance with present principles, a processor on the battery pack itself may be used at least in part to manage current to the battery.

It may now be appreciated that present principles provide for e.g. a multi-step battery charge at different voltage ranges of and/or at charge rates, where e.g. a faster-charging material on the cathode may be used for an initial relatively last charge up to a threshold amount of voltage for the battery, and then both the faster-charging material and a slower-charging material on the cathode may be used to continue to charge the battery at a relatively slower charge rate as long as a power supply remains available, Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is nota transitory signal and/or a signal per se.

While the particular BATTERY WITH CATHODE MATERIALS FOR CHARGING AT DIFFERENT RATES is herein shown and described in detail, it is to be understood that the subject matter which is encompassed by the present application is limited only by the claims.

What in claimed is:

1. A device, comprising:
   at least one processor;
   at least one system component accessible to the at least one processor; and
   a battery which powers the at least one processor and the at least one system component, the battery comprising:
      at least one anode;
      at least one cathode, wherein the at least one cathode comprises at least a first charging material and at least a second charging material different from the first material; and
      electrolyte between the at least one anode and at least one cathode;
   wherein the first charging material, responsive to current being provided to the at least one cathode, charges the battery at a faster rate than the second charging material can charge the battery;
   wherein the at least one processor accesses instructions executable to control current to the battery to charge the battery up to a threshold amount using at least the first charging material but not the second charging material, and wherein the instructions are executable to control current to the battery to charge the battery from the threshold amount to at least substantially fully charged using at least the second charging material;
   wherein the instructions are executable to determine to charge the battery using one of a first amount of current and a second amount of current based at least in part on receipt of input to a selector element that is associated with one of the first amount of current and the second amount of current but not the other of the first amount of current and the second amount of current.

2. The device of claim 1, wherein the at least one processor controls current to the battery to charge the battery using the first amount of current and at least the first charging material, and wherein the at least one processor controls current to the battery to charge the battery using the second amount of current and at least both of the first charging material and the second charging material, wherein the second amount of current is different from the first amount of current.

3. The device of claim 2, wherein the first amount of current is for a first C rate in the range of 1.0 C to 2.0 C, and wherein the second amount of current is for a second C rate in the range of 0.1 C to 0.6 C.

4. The device of claim 1, wherein the at least one cathode comprises at least the first charging material, the second charging material, and a third charging material different from both the first charging material and the second charging material; and
   wherein each of the first charging material, the second charging material, and the third charging material are able to charge the battery at different maximum charge rates when current is provided to the at least one cathode.

5. The device of claim 1, wherein the threshold amount is a threshold amount from fully charged.

6. The device of claim 5, wherein the threshold amount from fully charged is a threshold voltage from fully charged.

7. The device of claim 5, wherein the threshold amount from fully charged is a threshold percentage from fully charged.

8. The device of claim 1, wherein the at least one processor controls current to the battery to charge the battery using the first charging material based at least in part on an amount of time a power source which charges the battery is estimated by the device to be available.

9. The device of claim 1, wherein the selector element is a depressable button protruding from the device.

10. The device of claim 1, wherein the selector element is presented as part of a graphical user interface (GUI) presented on a display accessible to the at least one processor.

11. The device of claim 10, wherein the selector element is a first selector element, wherein the first selector element is associated with the first amount of current, wherein the GUI comprises a second selector element different from the first selector element, the second selector element being associated with the second amount of current, and wherein the instructions are executable to:
- determine to charge the battery using the first amount of current based at least in part on receipt of input to the first selector element;
- responsive to a determination to charge the battery using the first amount of current based at least in part on receipt of input to the first selector element, charge the battery using the first amount of current;
- determine to charge the battery using the second amount of current based at least in part on receipt of input to the second selector element; and
- responsive to a determination to charge the battery using the second amount of current based at least in part on receipt of input to the second selector element, charge the battery using the second amount of current.

12. The device of claim 11, wherein the GUI indicates the first amount of current via first text presented on the GUI, and wherein the GUI indicates the second amount of current via second text presented on the GUI, the first text being different from the second text.

13. The device of claim 12, wherein the first text specifies the first amount of current, and wherein the second text specifies the second amount of current.

14. The device of claim 12, wherein the first text indicates the first amount of current via text indicating "normal", and wherein the second text indicates the second amount of current via text indicating "fast".

15. The device of claim 11, wherein the GUI comprises a prompt to select one of the first selector element and the second selector element.

16. The device of claim 10, wherein the GUI comprises an element at which a user can enter an amount of time available for charging the battery.

17. A method, comprising:
- providing a negative electrode in a battery casing for a battery;
- providing a positive electrode in the battery casing, wherein the positive electrode is comprised of at least two different compounds which are useable to charge the battery at different rates of charge;
- providing electrolyte between the negative electrode and the positive electrode;
- providing at least one processor and storage accessible to the at least one processor, wherein the storage comprises instructions executable by the at least one processor to control charge of the battery up to a threshold amount from fully charged using a first charging rate and a first compound of the at least two different compounds but not using a second compound of the at least two different compounds, and wherein the instructions executable by the at least one processor to control charge of the battery using a second charging rate and at least the second compound of the at least two different compounds responsive to the battery reaching the threshold amount from fully charged, the second charging rate being slower than the first charging rate, wherein the at least one processor controls the rate of charge to the battery based at least in part on receipt of user input directed to a selector element that is associated with one of the first charging rate and the second charging rate but not the other of the first charging rate and the second charging rate.

18. The method of claim 17, wherein the selector element is selected from the group consisting of: a depressable button, a touchable selector element presented on a touch-enabled display.

19. The method of claim 17, wherein the at least one processor controls the rate of charge to the battery based at least in part on an amount of time a power source which charges the battery is estimated, by a device housing the battery, to be available.

20. The method of claim 17, wherein the threshold amount from fully charged is a threshold voltage from fully charged.

21. The method of claim 17, wherein the threshold amount from fully charged is a threshold percentage from fully charged.

22. A battery pack, comprising:
- at least one processor;
- a battery which powers the at least one processor, the battery comprising:
  - at least one anode;
  - at least one cathode, wherein the at least one cathode comprises at least a first charging material and at least a second charging material different from the first material; and
- electrolyte between the at least one anode and at least one cathode;
- wherein the at least one processor controls charging of the battery at a first charging rate using the first charging material but not the second charging material up to a threshold amount from fully charged, and wherein responsive to the battery reaching the threshold amount from fully charged the at least one processor controls charging of the battery at a second charging rate using at least the second charging material, the second charging rate being slower than the first charging rate, wherein responsive to selection of a selector element the at least one processor initiates charging of the battery up to the threshold amount from fully charged using the first charging rate, the selector element being a graphical selector element presented on a graphical user interface (GUI), the GUI presented on a display accessible to the at least one processor, the selector element being associated with initiating a charge of the battery using the first charging rate but not being associated with initiating a charge of the battery using the second charging rate.

23. The battery pack of claim 22, wherein the threshold amount from fully charged is a threshold voltage from fully charged.

24. The battery pack of claim 22, wherein the threshold amount from fully charged is a threshold charge percentage from fully charged.

25. The battery pack of claim 22, wherein the at least one processor controls charging of the battery at the first charging rate using the first charging material up to the threshold amount from fully charged based at least in part on an amount of time a power source which charges the battery is estimated by the at least one processor to be available for charging the battery at a given location and time of day.

26. The battery pack of claim 22, wherein the selector element is a first selector element, and wherein responsive to selection of a second selector element the at least one processor initiates charging of the battery up to the threshold amount from fully charged using the first charging rate, the second selector element being a depressable button coupled to the battery pack, the second selector element being associated with initiating a charge of the battery using the first charging rate but not being associated with initiating a charge of the battery using the second charging rate.

27. A method, comprising:
- charging a battery up to a threshold amount from fully charged using a first charging rate and a first charging material;
- charging the battery an additional amount above the threshold amount using a second charging rate and a second charging material responsive to the battery reaching the threshold amount from fully charged, the second charging rate being slower than the first charging rate;
- presenting a selector element via a graphical user interface (GUI) that is presented on a display, the selector element being selectable by a user to initiate charging the battery up to the threshold amount from fully charged using the first charging rate and the first charging material but not using the second charging material, the selector element being associated with charging the battery up to the threshold amount using the first charging rate but not the second charging rate; and
- responsive to selection of the selector element, charging the battery up to the threshold amount from fully charged using the first charging rate and the first charging material but not the second charging material, and then charging the battery above the threshold amount using the second charging rate and at least the second charging material responsive to the battery reaching the threshold amount from fully charged.

28. The method of claim 27, comprising:
charging the battery up to the threshold amount from fully charged using the first charging rate and the first charging material based at least in part on an amount of time a power source which is to charge the battery is estimated to be available for charging the battery one or more of: at a given location, at a given time of day.

* * * * *